(12) United States Patent
Mizutani

(10) Patent No.: US 8,605,170 B2
(45) Date of Patent: Dec. 10, 2013

(54) IMAGING DEVICE, METHOD OF PROCESSING CAPTURED IMAGE SIGNAL AND COMPUTER PROGRAM

(75) Inventor: Tomoyuki Mizutani, Kanagawa (JP)

(73) Assignee: Sony Corporation (JP)

( * ) Notice: Subject to any disclaimer, the term of this patent is extended or adjusted under 35 U.S.C. 154(b) by 549 days.

(21) Appl. No.: 12/151,106

(22) Filed: May 2, 2008

(65) Prior Publication Data

US 2008/0284875 A1    Nov. 20, 2008

(30) Foreign Application Priority Data

May 14, 2007    (JP) ............................... P2007-128201

(51) Int. Cl.
*H04N 5/76*    (2006.01)
(52) U.S. Cl.
USPC .................................. 348/231.6; 348/231.99
(58) Field of Classification Search
USPC ......................................... 348/231.99, 231.6
See application file for complete search history.

(56) References Cited

U.S. PATENT DOCUMENTS

| | | | |
|---|---|---|---|
| 6,570,614 B1 * | 5/2003 | Kubo et al. ................. | 348/231.6 |
| 2003/0112345 A1 * | 6/2003 | Yamaguchi et al. ....... | 348/231.6 |
| 2003/0184656 A1 * | 10/2003 | Parulski et al. .......... | 348/207.99 |
| 2005/0041121 A1 * | 2/2005 | Steinberg et al. ............. | 348/239 |
| 2005/0052553 A1 * | 3/2005 | Kido et al. .................... | 348/296 |

FOREIGN PATENT DOCUMENTS

| | | | |
|---|---|---|---|
| JP | 05-328279 A | | 12/1993 |
| JP | 10-257365 A | | 9/1998 |
| JP | 2001257926 A | | 9/2001 |
| JP | 2001257977 | * | 9/2001 |

OTHER PUBLICATIONS

Office Action from Japanese Application No. 2007-128201, dated Jun. 28, 2011.

* cited by examiner

*Primary Examiner* — Joel Fosselman

(74) *Attorney, Agent, or Firm* — Lerner, David, Littenberg, Krumholz & Mentlik, LLP

(57) ABSTRACT

A constant amount of new portion of image data as still images is always stored on a memory in an image taking operation. In response to a shutter release operation, the image data stored on the memory is recorded onto a recording medium. A next new portion of the image data generated subsequent to the shutter release operation is then recorded on the recording medium to provide a photo opportunity slip prevention function. An operation is performed to modify a pixel count of the image data to be recorded in the photo opportunity slip prevention function. A user can multi-shot photograph with a pixel count of images captured within a unit time increased or with a higher priority placed on image quality.

4 Claims, 9 Drawing Sheets ized in the operation of the operation unit.
IMAGING DEVICE, METHOD OF PROCESSING CAPTURED IMAGE SIGNAL AND COMPUTER PROGRAM

CROSS-REFERENCE TO RELATED APPLICATIONS

The present application claims priority from Japanese Patent Application No. JP 2007-128201, filed in the Japanese Patent Office on May 14, 2007, the entire content of which is incorporated herein by reference.

BACKGROUND OF THE INVENTION

1. Field of the Invention

The present invention relates to an imaging device recording, on a recording medium, a still image captured as image information and an image signal processing method of the imaging device. The present invention also relates to a computer program to be executed by the imaging device.

2. Description of the Related Art

Imaging devices such as digital still cameras are now in widespread use. Such an imaging device records still image data obtained from a captured image onto a recording medium during photographing.

When a photographing operation is performed, an actually taken picture often shows that the shutter release timing slips from the best timing of photo opportunity. This is particularly true when a subject is moving. One of the reasons for the timing difference is that it takes time for humans to take action in response to sensing the photo opportunity. Since the imaging device is operated by the human operator, missing the photo opportunity due to release timing delay is unavoidable.

Japanese Unexamined Patent Application Publications Nos. 5-328279 and 10-257365 disclose imaging devices such as digital still cameras that prevent photo opportunity timing slip by taking a predetermined number of images prior to a shutter release operation timing. Such a photo opportunity slip prevention function causes the imaging device to take and record pictures prior to the shutter release operation. Even when the shutter release operation is untriggered, a predetermined number of images of captured still image data is stored on a memory. It is highly likely that the recorded still image data, namely, photographs contain an image the user has intended to take. This arrangement frees the user from missing the photo opportunity due to shutter timing slip.

SUMMARY OF THE INVENTION

It is thus desirable to provide a photo opportunity slip prevention function in an imaging device. The photo opportunity slip prevent function is desirably improved in step with the current technological advancement of the imaging device and serves the user's convenience.

In accordance with one embodiment of the present invention, an imaging device includes an image signal acquisition unit for acquiring an image signal in an electrical form by converting input image-bearing light into the image signal, a data generation unit for generating successively image data containing a still image by inputting successively the image signal corresponding to one still image unit, a record control unit for recording, on a recording medium, at least one of the image data of a predetermined number of units successively acquired prior to a timing of a shutter release operation and the image data of a predetermined number of units successively acquired subsequent to the timing of the shutter release operation, an operation unit for performing an operation to modify a pixel count of pixels of the image data, the image data containing a two-dimensional set of pixels, and a pixel count setting control unit for controlling setting of the pixel count so that the pixel count of the image data to be recorded by the record control unit reaches the pixel count specified in the operation of the operation unit.

In accordance with one embodiment of the present invention, an image signal processing method includes steps of acquiring an image signal in an electrical form by converting input image-bearing light into the image signal, generating successively image data containing a still image by inputting successively the image signal corresponding to one still image unit, recording, on a recording medium, at least one of the image data of a predetermined number of units successively acquired prior to a timing of a shutter release operation and the image data of a predetermined number of units successively acquired subsequent to the timing of the shutter release operation, storing setting information relating to a pixel count modified in response to a modification operation of the pixel count of pixels of the image data, the image data containing a two-dimensional set of pixels, and controlling setting of the pixel count so that the pixel count of the image data to be recorded reaches the pixel count specified in the setting information.

In accordance with one embodiment of the present invention, a computer program of an imaging device includes steps of generating successively image data containing a still image by inputting successively an image signal in an electrical form corresponding to one still image unit, the image signal acquired from input image-bearing light, recording, on a recording medium, at least one of the image data of a predetermined number of units successively acquired prior to a timing of a shutter release operation and the image data of a predetermined number of units successively acquired subsequent to the timing of the shutter release operation, storing setting information relating to a pixel count modified in response to a modification operation of the pixel count of pixels of the image data, the image data containing a two-dimensional set of pixels, and controlling setting of the pixel count so that the pixel count of the image data to be recorded reaches the pixel count specified in the setting information.

In accordance with one embodiment of the present invention, the photo opportunity slip prevention function works in both cases, namely, in one case where the user places a higher priority on high image quality and in the other case where the user places a higher priority on the effectiveness of photo opportunity slip prevention. Since a pixel count of the image is not fixed, the user can select between a photo opportunity slip prevention prioritized mode and a high-quality image prioritized mode. The photo opportunity slip prevention function thus becomes effective.

DESCRIPTION OF THE PREFERRED EMBODIMENTS

The embodiments of the present invention are described below with reference to the drawings. A digital still camera is applied as an imaging device 1 in accordance with one embodiment of the present invention.

Figure 1:
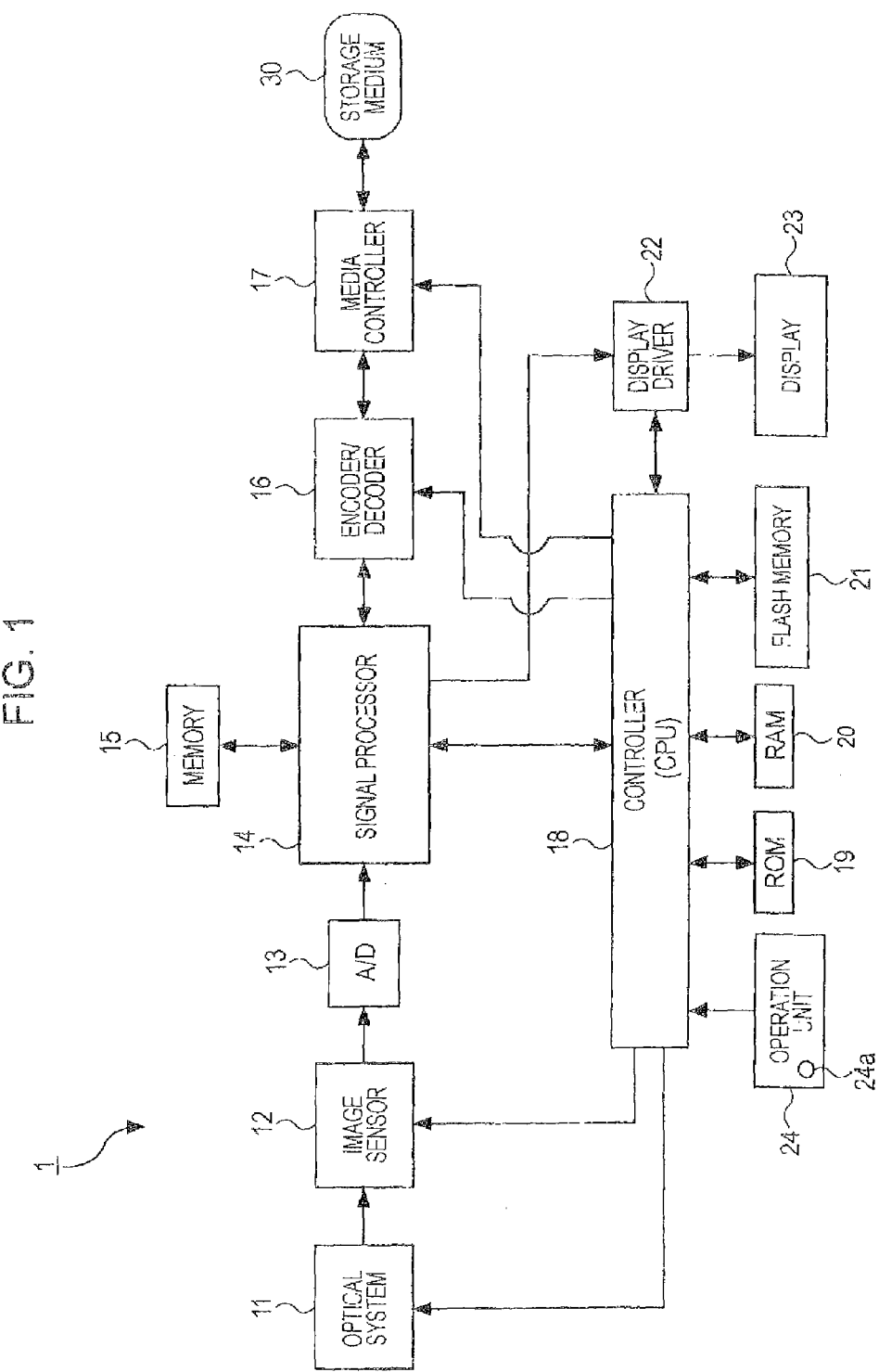
FIG. 1 is a block diagram of an imaging device in accordance with one embodiment of the present invention.

FIG. 1 illustrates the imaging device 1 in accordance with the embodiment of the present invention.

The imaging device 1 has a basic function to acquire image-bearing light and convert the image-bearing light into an electrical signal. The imaging device 1 then processes the resulting signal, thereby resulting in image data as a captured still image. The image data is then stored on a recording medium and displayed on a display 23 as an image.

As shown in FIG. 1, an optical system 11 includes a group of lenses, composed of a plurality of imaging lenses such as a zoom lens and a focusing lens, and an iris unit. The optical system 11 focuses input light as an image-bearing light beam on an image sensor 12.

The optical system 11 also includes drivers for driving the zoom lens, the focusing lens, and the iris unit. The drivers are controlled by the controller 18 that performs camera control. The camera control includes a zoom control process, an auto focus control process and an auto exposure control process.

The image sensor 12 performs photoelectric conversion to convert the image-bearing light beam picked up by the optical system 11 into the electrical signal. The image sensor 12 receives the image-bearing light beam from the optical system 11 on a light receiving surface of a photoelectric converter element and successively outputs, at predetermined timings, a signal charge accumulated in response to a strength of received light. The electrical signal (image signal) responsive to the image-bearing light thus results. The photoelectric converter element employed for the image sensor 12 is not limited to any particular one. For example, a complementary metal oxide (CMOS) or a charge coupled device (CCD) may be used for the image sensor 12. If a CMOS sensor is employed, the CMOS sensor corresponding to the image sensor 12 may include an analog-to-digital converter corresponding to an A/D converter 13.

The image signal output from the image sensor 12 is input to the A/D converter 13 for analog-to-digital conversion. A resulting digital signal is input to a signal processor 14.

The signal processor 14 receives the digital image signal from the A/D converter 13 by still image unit (frame image). Predetermined signal processing is performed on the image signal received by still image unit. The image data corresponding to a single still image is thus obtained. The image data is then written on a memory 15.

The image data generated by the signal processor 14 is to be stored on a recording medium 30 as information of a captured image corresponding to a photograph. In this case, the image data corresponding to a single still image is output from the signal processor 14 to the encoder/decoder 16.

In accordance with a predetermined still image compression encoding method, the encoder/decoder 16 performs a compression encoding process on the image data output by still image unit from the signal processor 14. The encoder/decoder 16 under the control of the controller 18 adds a head to the compressed image data, thereby converting the image data into a compressed still image file in a predetermined format. The compressed still image file thus generated is then transferred to a media controller 17. The media controller 17 under the control of the controller 18 writes the data of the compressed still image file onto the recording medium 30. The recording medium 30 is a compact removable type medium such as a flash memory. The recording medium 30 is inserted into a slot thereof arranged in the imaging device 1.

The imaging device 1 causes the image data obtained by the signal processor 14 to be displayed on a display 23. The imaging device 1 thus displays on the display 23 a monitor image currently captured. Upon receiving the image data output from the A/D converter 13, the signal processor 14 generates the image data of one still image. By repeating such an operation, the signal processor 14 generates the image data corresponding to a frame in a moving image. Under the control of the controller 18, the signal processor 14 transfers to a display driver 22 the image data thus successively generated.

The display driver 22 generates a driver signal driving the display 23, based on the image data input from the signal processor 14. The display driver 22 thus displays images in accordance with the image data on a per still image unit basis. The user sees the images successively displayed on the display driver 22 as a monitor. The user may feel as if viewing a moving picture.

The imaging device 1 plays the still image file stored on the recording medium 30 and causes the image to be displayed on the display 23.

By specifying a particular still image file, the controller 18 commands the media controller 17 to read the corresponding data from the recording medium 30. In response to the command, the media controller 17 accesses an address on the recording medium 30 storing the specified still image file, reads the data, and then transfers the read data to the encoder/decoder 16.

The encoder/decoder 16 under the control of the controller 18 extracts a data body as the image data from the data of the still image file transferred from the media controller 17 and acquires the image data of one still image by performing a decoding process on the compressed still image data. The encoder/decoder 16 transfers the decoded image data to the display driver 22. The display driver 22 thus displays on the display 23 the image of the still image file stored on the recording medium 30.

The display 23 can display a user interface image functioning a graphic user interface (GUI) together with the monitor image and the played image of the still image file. Depending on an operational status of the imaging device 1, the controller 18 generates display image data as a user interface image and outputs the generated display image data to the display driver 22. The display driver 22 thus displays the user interface image. As a particular menu screen, the user interface image may be displayed on the display screen of the display 23 separately from the monitor image and the played image of the still image file. Alternatively, the user interface image may be overlaid on or combined with the monitor image or the played image of the still image file.

The controller 18 includes a central processing unit (CPU) and forms a micro computer together with a read-only memory (ROM) 19 and a random-access memory (RAM) 20. The ROM 19 stores a program to be performed by the CPU as the controller 18 and a variety of setting information related to an operation of the imaging device 1. The RAM 20 serves as a main memory for the CPU.

The flash memory 21 is a non-volatile storage area to store a variety of setting information that is updated in accordance with user operation and operation history of the imaging device 1. If a non-volatile memory such as a flash memory is used for the ROM 19, part of the ROM 19 may be substituted for the flash memory 21.

The operation unit 24 includes a variety of controls for the imaging device 1 and an operation information signal output section for outputting to the CPU an operation information signal generated in response to an operation of each control. In response to the operation information signal input via the operation unit 24, the controller 18 performs a predetermined process responsive to the input operation information signal. The imaging device 1 thus performs an operation responsive to the user operation.

A shutter key 24a as a control on the operation unit 24 is illustrated in FIG. 1. The shutter key 24a enters a trigger for photographing and has a structure receiving a pressing action. If the shutter key 24a is half-pressed (for focusing), the auto focus control process is performed. The imaging device 1 automatically adjusts focusing (in focusing lens driving) to focus on a subject to be photographed. If the shutter key 24a is further pressed to a full-pressed state from the half-pressed state (in shutter release operation), a captured image is recorded. The still image file obtained from the image signal (with a data body thereof being the image data) is recorded on the recording medium 30.

The imaging device 1 in accordance with one embodiment of the present invention performs a photographing and recording operation to record the captured image (still image file) onto the recording medium 30. The photographing and recording operation is performed in a standard photographing mode in which a standard photographing operation is preformed to record a captured image.

In the standard photographing mode, the imaging device 1 records on the recording medium 30 a captured image photographed in response to the shutter release operation on the shutter key 24a. The captured image is a single still image file as the image data for one still image.

In accordance with one embodiment of the present invention, the photographing and recording operation may be performed in a photo opportunity slip prevention function. The photo opportunity slip prevention function is performed with reference to the shutter release operation. More specifically, the recording medium 30 stores a plurality of still images (still image file) multi-shot photographed in retrospect within a predetermined period of time before the shutter release operation and a plurality of still images (still image file) multi-shot photographed within a predetermined period of time extending from the shutter release operation into a later time point.

The term "multi-shot" photographed means that the recording of images (still image file) consecutively captured at predetermined intervals on a recording medium is automatically performed by the imaging device 1.

The standard photographing mode means a typical photographing operation widely performed by digital still cameras.

As previously discussed, it is difficult to obtain an image at a timing intended by the user in the photographing and recording operation in the standard photographing mode. More specifically, it is likely that the user slips a photo opportunity timing desired by the user. As previously discussed, a time lag takes place between when the human user perceives the photo opportunity and when the user presses the shutter key in response thereto. Even if the user think he or she has immediately pressed in response to the photo opportunity, a slight time lag actually takes place in the pressing of the shutter key 24a. A digital imaging device such as a digital still camera has other factors that cause a time lag between the shutter release operation timing and the image pickup timing desired by the user. The other factors include a data rate of the signal from the image sensor and a time to process a digital signal.

The images multi-shot photographed within predetermined periods of time prior to and subsequent to the shutter release operation are recorded on the recording medium 30 in the photo opportunity slip prevention function. It is highly likely that an image taken at a timing desired by the user or an image taken at a timing close to the desired timing is contained in the recorded images.

In accordance with one embodiment of the present invention, the imaging device 1 may modify the pixel count of the image data to be multi-shot recorded, with respect to a preset standard value in response to a user setting in the photo opportunity slip prevention function.

When the image data corresponding to a single still image is composed of a set of two-dimensional pieces of image data, the pixel count indicates the actual number of pieces of image data forming the actual image data. Generally, the pixel count is obtained by multiplying the number of pieces of image data in a horizontal direction and the number of pieces of image data in a vertical direction.

The pixel count corresponds to the pixel count of a light receiving unit in the image sensor 12 for picking up an effective image signal (image-capturing pixel count) if no decimation is performed on the image data in a signal processing operation and if no pixel count conversion process is performed through interpolation.

The imaging device 1 includes in the photo opportunity slip prevention function three pixel count modes, namely, a "standard mode," a "photo opportunity prioritized mode," and an "image quality prioritized mode." The user can select one of the three modes to modify the pixel count.

In the "standard mode," image data having a standard pixel count are multi-shot captured in the photo opportunity slip prevention function.

In the "photo opportunity prioritized mode," image data having a predetermined pixel count smaller than the standard pixel count is multi-shot captured in the photo opportunity slip prevention function.

In the "image quality prioritized mode," image data having a predetermined pixel count larger than the standard pixel count is multi-shot captured in the photo opportunity slip prevention function.

The larger the pixel count of the image data, the higher the definition of the image data, and a higher-definition image results. As a result, the data size of the image data increases, workload in signal processing increases, and time to process one frame of image lengthens. In the photo opportunity slip prevention function, the process time to process each unit of imaging device corresponds to a duration of time from recording one unit of image data to starting recording next unit of imaging device, namely, the multi-shot interval. The shorter the multi-shot interval, the larger the number of units of image data photographed per unit time becomes. The possibility of the photo opportunity slip is reduced. In accordance with the photo opportunity slip prevention function of one embodiment of the present invention, there is a trade-off between the image quality of the image data responsive to the pixel count and the multi-shot interval.

The standard pixel count in the standard mode is determined as the one providing the most appropriate balance in the photo opportunity slip prevention function between the image quality and the multi-shot interval.

For example, when the user photographs in the standard mode in the photo opportunity slip prevention function, a resulting image is expected to have an acceptable image quality and an acceptable multi-shot interval.

In contrast, in the photo opportunity prioritized mode, the pixel count smaller than the standard pixel count is set. With the smaller pixel count, the image quality is lower than in the standard mode, but the multi-shot interval becomes short, and the number of units of image data captured per unit time increases. The possibility of the photo opportunity slip, namely, the shutter release slip is lower than in the standard mode.

In the case of a fast-moving photograph subject, the user may think the photo opportunity slip prevention more important than the image quality. In such a case, the photo opportunity prioritized mode is set.

In the "image quality prioritized mode," the pixel count larger than the standard pixel count is set. The multi-shot interval is prolonged, but the quality of the image photographed is higher than in the standard mode.

In the case of a slow-moving photograph subject, the use may think image quality more important than the photo opportunity slip prevention, and the image quality prioritized mode is set.

Figure 2:
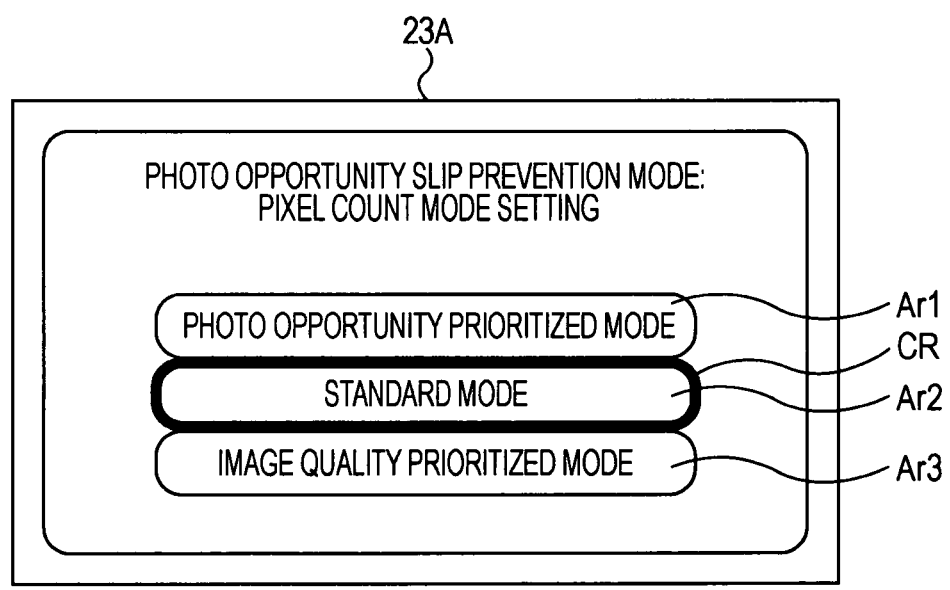
FIG. 2 illustrates an operation screen for selecting and setting a pixel count mode in the photo opportunity slip prevention function in accordance with one embodiment of the present invention.

FIG. 2 illustrates a display example of an image count mode setting screen on which the user can select and determine the pixel count mode.

For example, the user may now operate a predetermined control on the operation unit 24 in the imaging device 1 to show the pixel count mode setting screen as one of menu screens related to the photo opportunity slip prevention function. As shown in FIG. 2, the pixel count mode setting screen is displayed on a display screen 23A of the display 23.

The pixel count mode setting screen displays a photo opportunity prioritized mode selection area Ar1, a standard mode selection area Ar2 and an image quality prioritized mode selection area Ar3. A cursor CR is placed in one of the three selection areas.

The cursor CR is moved among the three selection areas Ar1, Ar2 and Ar3 in response to an operation of a predetermined control by the user. The mode indicated by the selection area emphasized by the cursor CR placed thereon is the mode selected by the user. The user places the cursor CR on one of the photo opportunity prioritized mode selection area Ar1, the standard mode selection area Ar2 and the image quality prioritized mode selection area Ar3, whichever the user desires, and then performs a predetermined operation to enter the selection. The imaging device 1 sets one of the photo opportunity prioritized mode, the standard mode and the image quality prioritized mode in the photo opportunity slip prevention function.

The determined setting related to the pixel count in the photo opportunity slip prevention function is stored on the flash memory 21 as pixel count mode setting information. More specifically, the pixel count mode setting information indicates which mode is selected to perform the photographing operation in the photo opportunity slip prevention function, namely, the standard mode, the photo opportunity prioritized mode, or the image quality prioritized mode.

The photo opportunity slip prevention function of one embodiment of the present invention is described below.

When a photographing operation is activated with the photo opportunity slip prevention function set, the imaging device 1 operates to always store on the memory 15 the image data as images photographed within a predetermined period extending in retrospect from the present time (preceding image storing operation). The imaging device 1 performs this operation regardless of which of the pixel count modes the imaging device 1 is in. The image data stored on the memory 15 can become a still image file to be stored on the recording medium 30 as multi-shot recorded preceding images.

Figure 3:
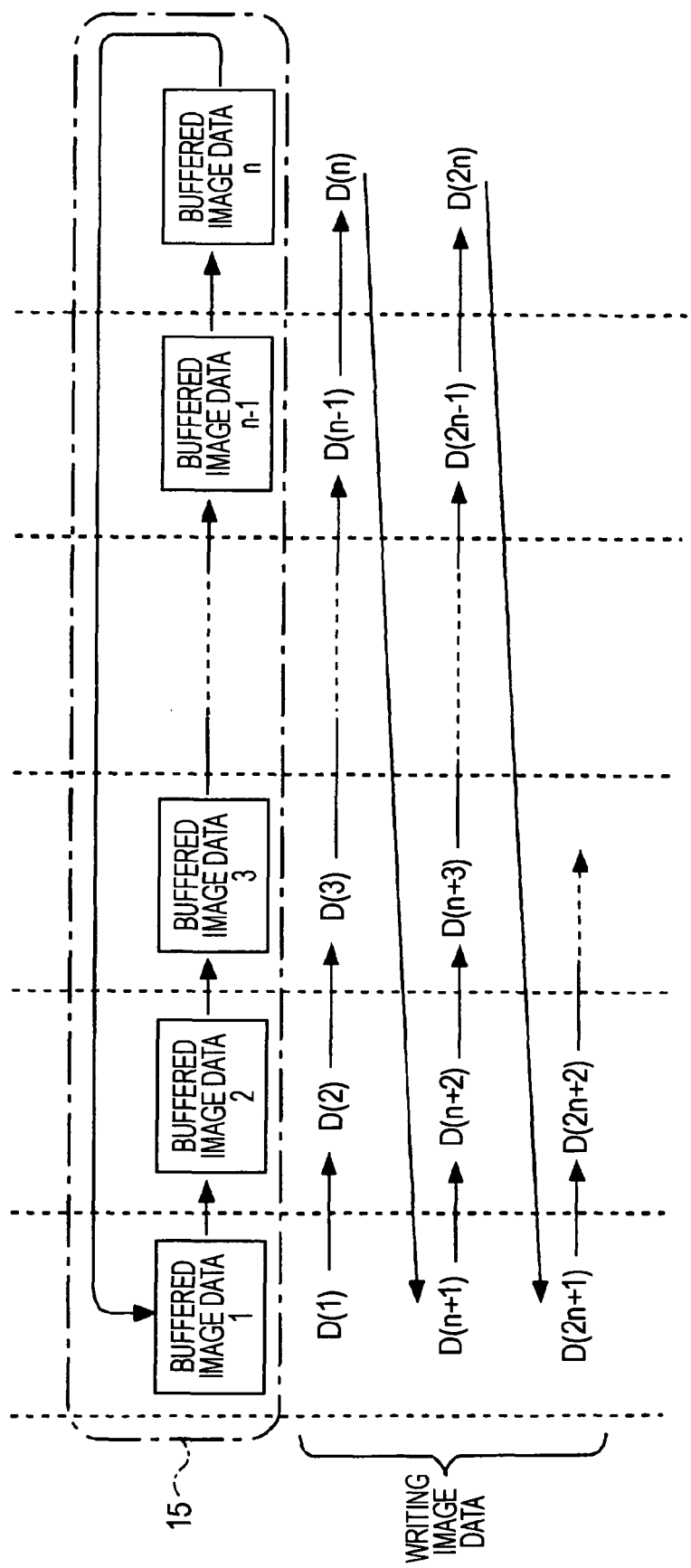
FIG. 3 diagrammatically illustrates a signal processing operation performed prior to a shutter release operation of the imaging device with a photo opportunity slip prevention function activated in accordance with one embodiment of the present invention.

FIG. 3 diagrammatically illustrates a signal processing procedure in the preceding image storage operation.

When the photographing operation starts with the photo opportunity slip prevention function activated, the signal processor 14 receives the signal image signal from the image sensor 12 via the A/D converter 13 and successively generates the image data corresponding to one still image. The image data thus generated is written and stored on an image data storage area of a predetermined memory capacity in the memory 15. The image data corresponding to one still image (captured image) is buffered on the memory 15. The image data is thus referred to as buffered image data.

When the photographing operation starts with the photo opportunity slip prevention function activated, the signal processor 14 writes first generated image data D(1) onto the memory 15. The signal processor 14 then successively generates and then writes image data D(2), D(3), . . . onto the memory 15. The memory 15 stores the buffered image data in the order of from old to new data. At the moment the storage operation proceeds to n-th buffered image data n, the memory 15 has no further memory space available for storing next buffered image data in the buffered image data storage area.

In this state, the signal processor 14 stores buffered image data D(n+1) at next (n+1)-th image by overwriting the buffered image data D(1) on the memory 15. The buffered image data D(1) is thus replaced with the buffered image data D(n+1). The signal processor 14 successively writes buffered image data D(n+2), . . . D(2n) at (n+2)-th, . . . , 2n-th images by overwriting buffered image data D(2), . . . , D(n) stored as buffered image data 2 through n. A similar overwriting process is repeated on buffered image data D(2n+1), D(2n+2), . . . by overwriting the buffered image data stored as buffered image data 1, 2, . . . on the memory 15.

In this way, the signal processor 14 updates the buffered image data stored on the memory 15 in a first-in-first out basis if the stored buffered image reaches a maximum number n. In other words, the oldest buffered image data is successively overwritten by new image data. When the imaging device 1 performs the photographing operation with the photo opportunity slip prevention function activated, the memory 15 always stores the latest image data of n images multi-shot photographed within a predetermined period of time in retrospect from the present time (except a duration of time throughout which the image data 1 through n is stored).

The standard mode in the photo opportunity slip prevention function is described below with reference to FIG. 4.

Figure 4:
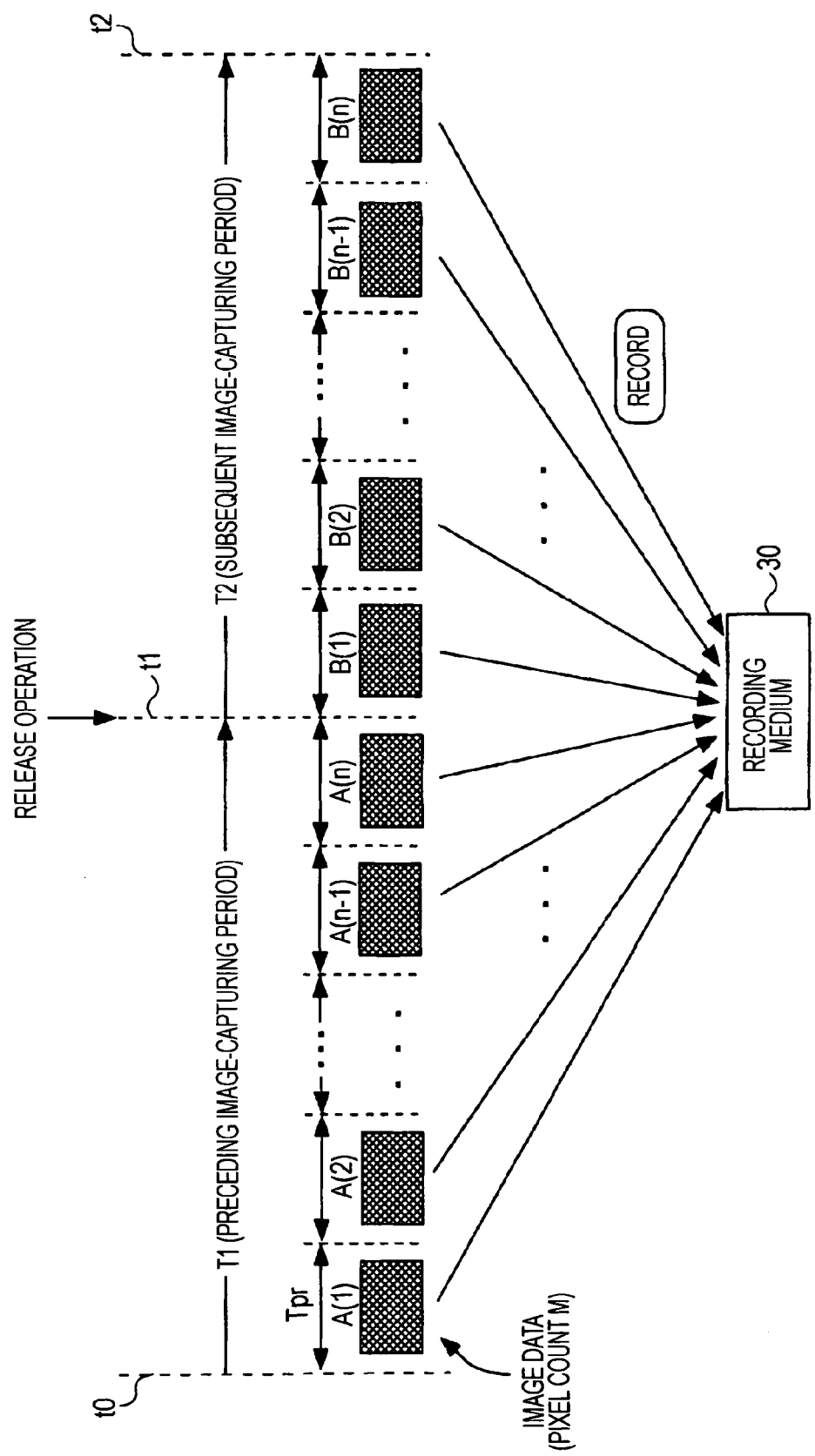
FIG. 4 diagrammatically illustrates the photographing and recording operation of the imaging device working in a standard mode of the photo opportunity slip prevention function in accordance with one embodiment of the present invention.

FIG. 4 illustrates image data A(1)-A(n) and image data B(1)-B(m). The image data is stored as the still image file on the recording medium 30 at timing of time t1 of the shutter release operation. FIG. 3 diagrammatically illustrates timings at which the signal processor 14 generates and stores the image data onto the memory 15.

As previously discussed with reference to FIG. 3, the latest n units of image data are stored in the photographing operation with the photo opportunity slip prevention function activated. In FIG. 4, the latest image data stored on the memory 15 is illustrated as n units of image data A(1)-A(n) generated within a period T1 extending in retrospect from the shutter release operation at time point t1 to time point t0.

For example, during a time length represented by process time Tpr starting at time point t0, the image data as the image data A(1) is generated from the image signal output from the image sensor 12 and then written onto the memory 15. This process repeated every process time Tpr. The image data as the image data A(2)-A(n) is generated and written onto the memory 15. The image data A(1)-A(n) as the preceding image data are closer to the present time in the order of A(1), A(2), . . . , A(n) with A(n) closest to the present time.

Each of the image data A(1)-A(n) has a pixel count of M. The pixel count M is determined for the standard mode.

The shutter release operation might be performed at time point t1.

The signal processor 14 in the imaging device 1 reads the image data stored on the signal processor 14, namely, the image data A(1)-A(n) of FIG. 4 at the shutter release operation timing at time point t1. The imaging device 1 then causes the signal processor 14 to write successively the image data onto the recording medium 30 as a still image file. The preceding images are stored first.

The signal processor 14 in the imaging device 1 generates the image data, namely, the image data B(1), B(2), . . . based on the image signal obtained on a real-time basis even after the shutter release operation at time point t1. The pixel count of each of the image data B(1)-B(n) thus generated is equal to the pixel count of the image data generated prior to time point t1, namely, the standard pixel count M.

The signal processor 14 in the imaging device 1 stores the n images of image data B(1)-B(n) obtained within a subsequent image-capturing period T2 from the shutter release operation at time point t1 to time point t2 onto the recording medium 30 as a still image file. The image data B(1)-B(n) stored on the recording medium 30 is subsequent images.

Each of the preceding image-capturing period T1 and the subsequent image-capturing period T2 is set to a time length appropriate to achieve most the photo opportunity slip prevention effect. If each of the preceding image-capturing period T1 and the subsequent image-capturing period T2 is too short, the images obtained within a short period immediately prior to the shutter release operation are obtained. An image before the short period escapes capturing. If each of the preceding image-capturing period T1 and the subsequent image-capturing period T2 is too long, the images extending in retrospect too long into the past are stored on the memory 15 and then recording medium 30. This is not preferable in view of overuse of the memory capacity of each of the memory 15 and the recording medium 30. The preceding image-capturing period T1 and the subsequent image-capturing period T2 are set to be appropriate not to cause such inconveniences. The preceding image-capturing period T1 and the subsequent image-capturing period T2 are set to be equal to each other in accordance with one embodiment of the present invention. The number of preceding images (image data A(1)-A(n)) thus equals the number of preceding images (image data B(1)-B(n)).

Figure 5:
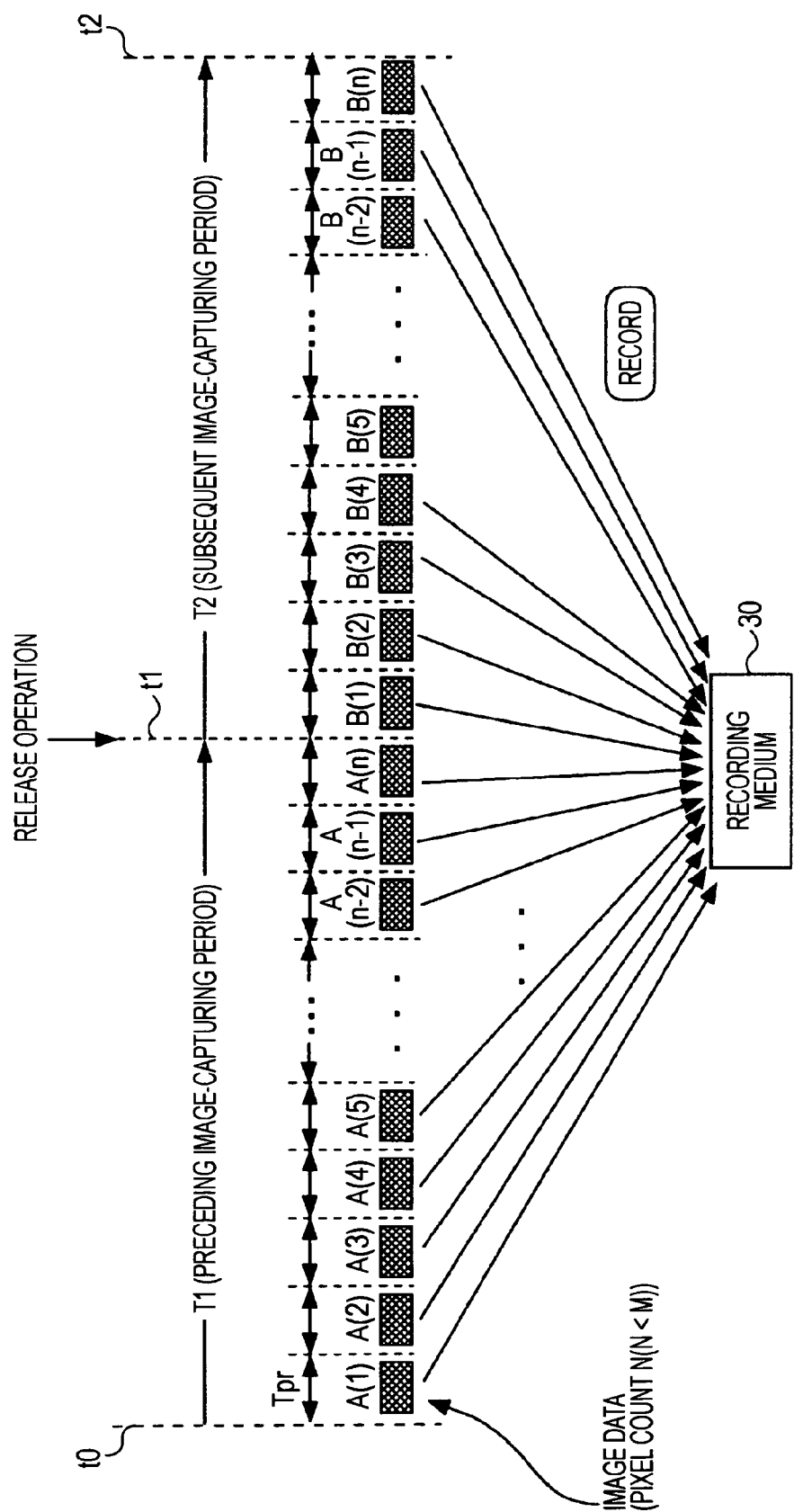
FIG. 5 diagrammatically illustrates a photographing and recording operation of the imaging device working in a photo opportunity prioritized mode of the photo opportunity slip prevention function in accordance with one embodiment of the present invention.

FIG. 5 illustrates the photo opportunity prioritized mode in the photo opportunity slip prevention function.

In the photo opportunity prioritized mode, each of the image data A(1)-A(n) as the preceding image data and the image data B(1)-B(n) as the subsequent images is set to have a predetermined pixel count N smaller than the pixel count M for the standard mode.

In accordance with one embodiment of the present invention, the pixel count of the image data is determined by setting, on the image sensor 12, capturing pixels of the pixel count corresponding to the pixel count of the image data. As shown in FIG. 4, to set each of the image data A(1)-A(n) and the image data image data B(1)-B(n) to have the pixel count of M, the capturing pixel count corresponding to the pixel count of M is set on the image sensor 12. If each of the image data A(1)-A(n) and the image data image data B(1)-B(n) is set to have the pixel count N, the capturing pixel count N is set to the image sensor 12.

If different capturing pixel counts are set on the image sensor 12, the process times Tpr for generating and writing the image data A(1)-A(n) and image data B(1)-B(n) on the memory 15 become different.

Before generating and then writing the image data onto the memory 15, the image signal of one still image is output from the image sensor 12 via the A/D converter 13 and then retrieved by the signal processor 14. The time of retrieving the image signal becomes long in proportion to the capturing pixel count set on the image sensor 12. The transfer speed of a signal per pixel depending on a transfer clock remains constant regardless of the capturing pixel count. An increase in the capturing pixel count set on the image sensor 12 leads to an increase in the process time for the signal processor 14 to generate the image data from the retrieved image signal and the time for the generated image data to be transferred from the signal processor 14 to the memory 15 for storage. The more the pixel count, the larger the data size of the image data. In the signal processing, the time to process one unit of image data and the time to transfer the generated image data increase accordingly. The more the pixel count, the larger the data size of the image data.

The pixel count N smaller than the pixel count M is set at each of the image data A(1)-A(n) as the preceding images and the image data B(1)-B(n) for the subsequent images in the photo opportunity prioritized mode of FIG. 5. The process time Tpr for each of the image data A(1)-A(n) and image data B(1)-B(n) is shorter than the process time Tpr in the standard mode.

The short process time Tpr means that the time period to the next session of the multi-shot images is short if the image data A(1)-A(n) and image data B(1)-B(n) is viewed as the multi-shot result. The short process time Tpr is translated into an increase in the number of images obtained from multi-shot operation per unit time. With short multi-shot intervals, the possibility of the photo opportunity slip prior to the shutter release operation is lower than in the standard mode.

The preceding image-capturing period T1 and the subsequent image-capturing period T2 in the photo opportunity prioritized mode are also approximately equal to the counterparts in the standard mode of FIG. 4. More strictly, the process time Tpr in the standard mode is different from the process time Tpr in the photo opportunity prioritized mode, and the preceding image-capturing period T1 and the subsequent image-capturing period T2 may not exactly be equal to the counterparts in the standard mode.

Given the approximately equal image-capturing periods T1 and T2, the memory 15 stores more image data in the photo opportunity prioritized mode than in the standard mode as the process time Tpr becomes short. Also, given the approximately equal image-capturing periods T1 and T2, the memory 15 stores approximately equal total amount of image data of n images in each of the standard mode and the photo opportunity prioritized mode.

In accordance with one embodiment of the present invention, the pixel count M of the image data for the standard mode may be 8 million pixels (8 M) and each of the preceding image-capturing period T1 and the subsequent image-capturing period T2 may be approximately 0.5 second. In the standard mode, seven to eight preceding images of image data may be obtained in each of the preceding image-capturing period T1 and the subsequent image-capturing period T2.

The pixel count M of the image data for the photo opportunity prioritized mode may be 2 million pixels (2 M) and each of the preceding image-capturing period T1 and the subsequent image-capturing period T2 may be approximately 0.5 second as in the standard mode. The process time Tpr to obtain the image data is proportional to the pixel count of the generated image data. The process time Tpr in the photo opportunity prioritized mode is about one quarter of the process time Tpr in the standard mode. In the photo opportunity prioritized mode, the number of images of image data obtained within the preceding image-capturing period T1 is about 30.

In the standard mode of FIG. 5, the pixel count of the image data is reduced to shorten the multi-shot intervals (corresponding to the process time Tpr) for the purpose of reducing the probability of the photo opportunity slip. Another technique of reducing the multi-shot intervals, as disclosed in Japanese Unexamined Patent Application Publication No. 5-328279, is to modify a pulse period (frequency) of a writing pulse signal determining a write timing to a memory. This technique allows the multi-shot intervals to be reduced with the pixel count of the image data remaining constant.

The image sensors in currently available imaging devices have a large pixel count and some of the image sensors have about 10 million pixels or so. The process time to generate and write one unit of image data in the imaging device increases accordingly. For technical and cost reasons, a processor generating the image data does not advance well in step with such an increase in the pixel count. Lengthening the process time of the image data makes the photographing operation slow and is hardly adopted as a technique in practice.

If the multi-shot interval (process time to generate the image data) is reduced by switching the frequency of the write pulse clock as disclosed in Japanese Unexamined Patent Application Publication No. 5-328279, the multi-shot interval needs to be set to be long with some degree of margin in the standard mode. If such a margin is permitted, the multi-shot interval in the image data of the pixel count M for the standard mode becomes too long to be practicable.

More specifically, in the current situation where the pixel counts of the image sensors in the imaging devices have been sharply increased, no sufficient photo opportunity slip prevention function can be provided by the technique disclosed in Japanese Unexamined Patent Application Publication No. 5-328279.

In accordance with one embodiment of the present invention, the multi-shot intervals are shortened by reducing the pixel count. With this arrangement, the maximum frequency can be always set for a clock signal for processing the image data and a practically sufficiently short time can be set for the multi-shot intervals of the image data of the pixel count M. In the photo opportunity prioritized mode, the multi-shot intervals can be shortened to the extent that the effect of reducing the probability of photo opportunity slip prevention is obtained.

According to Japanese Unexamined Patent Application Publication No. 10-257365, photographing interval T, corresponding to the multi-shot interval (process time Tpr) of one embodiment of the present invention, is set and modified. But the disclosure fails to state a technical arrangement of modifying the photographing interval. According to the disclosure, the photographing interval T is 0.5 second, 0.3 second, or the like. The technique of Japanese Unexamined Patent Application Publication No. 5-328279 for modifying the frequency of the write clock signal is also applicable to achieve the same purpose. In accordance with one embodiment of the present invention, eight to thirty images are multi-shot photographed within the preceding image-capturing period T1 as long as about 0.5 second. The photographing interval (multi-shot interval, namely, process time Tpr) is from about 62.5 ms to about 16 ms. The photographing interval is thus relatively shorter than the counterpart disclosed in Japanese Unexamined Patent Application Publication No. 10-257365. For this reason, the technique of varying the pixel count of the image data becomes effective to shorten the multi-shot intervals.

The pixel count mode likely to be used by the user next to the standard mode may be the photo opportunity prioritized mode. While the multi-shot photographing is performed in the photo opportunity prioritized mode, the user may wish to take pictures in high image quality.

To satisfy such user needs, the image quality prioritized mode is provided. The recording operation in the image quality prioritized mode is described below as shown in FIG. 6.

Figure 6:
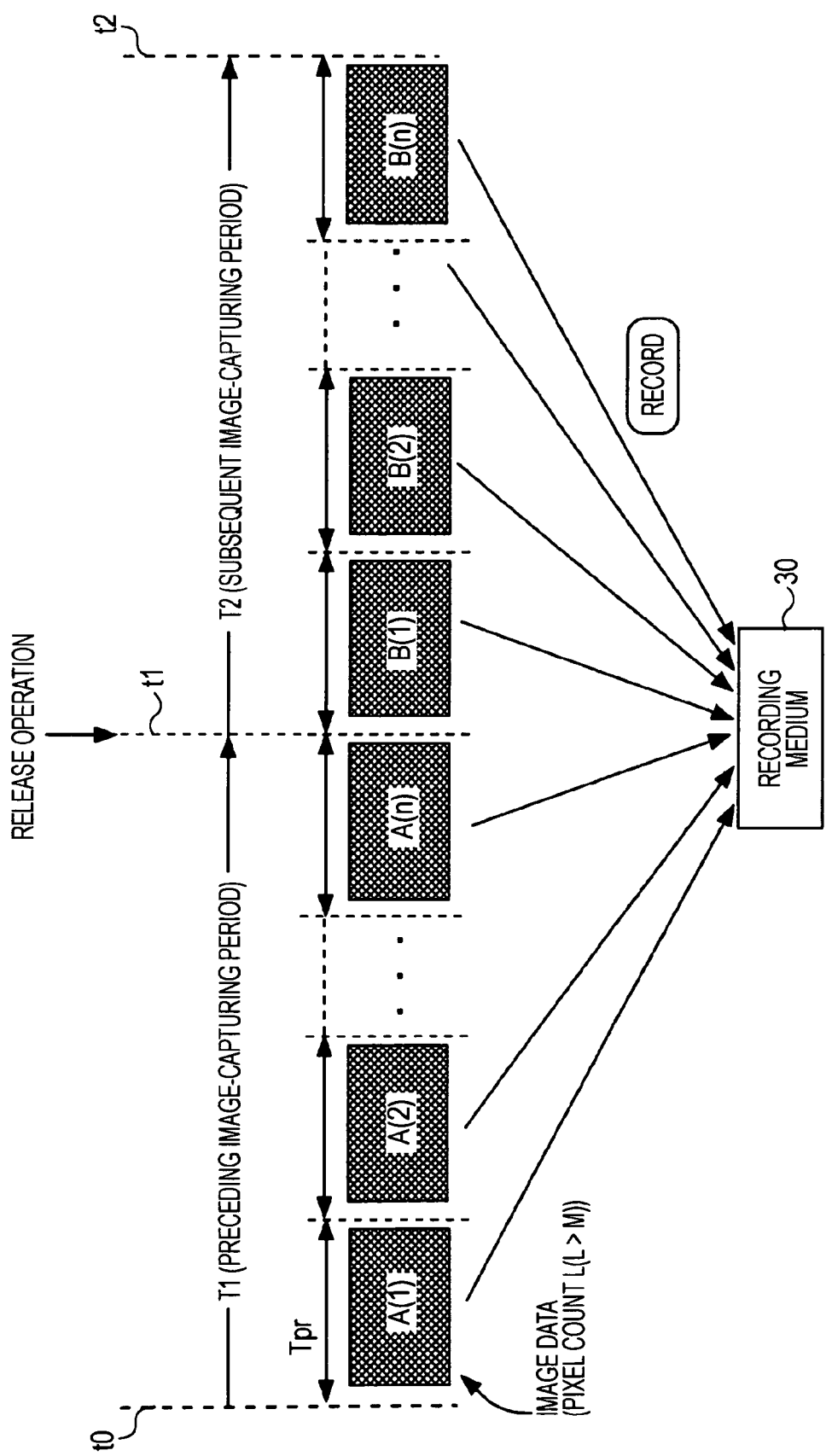
FIG. 6 diagrammatically illustrates the photographing and recording operation of the imaging device working in the standard mode of the photo opportunity slip prevention function in accordance with one embodiment of the present invention.

As shown in FIG. 6, a predetermined pixel count L larger than the pixel count M for the standard mode is set in each of the image data A(1)-A(n) as the preceding images and the image data image data B(1)-B(n) as the subsequent images. An image-capturing pixel corresponding to the pixel count L is set on the image sensor 12.

The image-capturing pixels larger than in the standard mode is set on the image sensor 12 and the pixel count L larger than the pixel count M for the standard mode is set for the image data image data A(1)-A(n) and image data B(1)-B(n) to be stored on the storage medium 30. The image quality prioritized mode of the three modes provides the highest quality images in the photo opportunity slip prevention function.

The image data of the pixel count L has a data size larger than that of the image data having the pixel count M for the standard mode. The process time Tpr to generate and write the image data is longer than in the standard mode. Given the same image-capturing periods (T1 and T2), the number of units of image data to be stored on the storage medium 30 becomes smaller.

Figure 7:
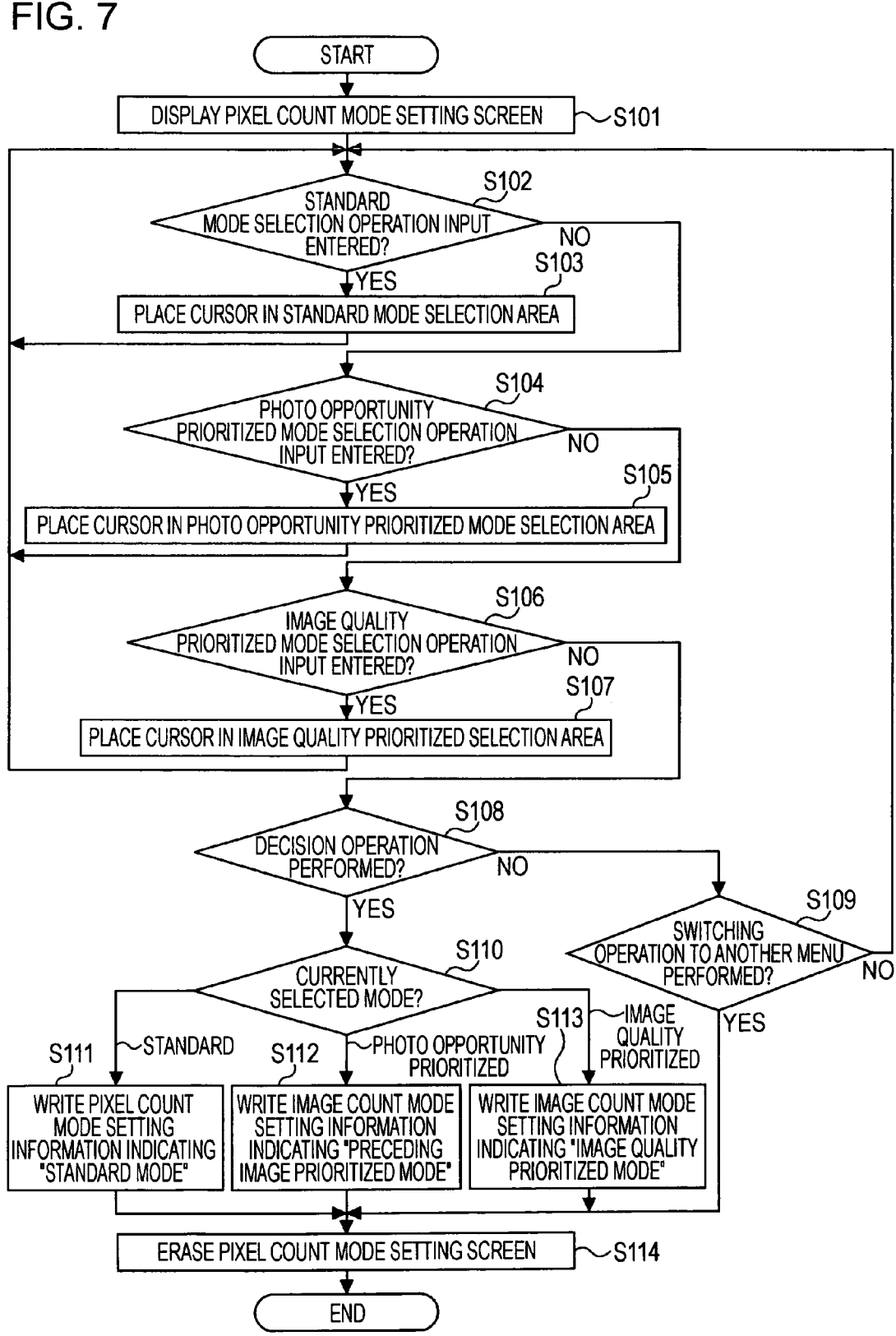
FIG. 7 illustrates a process of the imaging device responding to an operation performed to select and set the pixel count mode.

FIG. 7 is a flowchart illustrating an operation procedure performed by the imaging device 1 in order to respond to the pixel count setting discussed with reference to FIG. 2. The process of FIG. 6 is performed in accordance with the program of the CPU as the controller 18. The same is true of flowcharts of FIGS. 8 and 9.

A command to display a pixel count mode setting screen is now issued in response to the operation on the predetermined control on the operation unit 24 as previously discussed. The imaging device 1 (CPU) controls displaying of the pixel count mode setting screen on the display 23 in step S101. When the pixel count mode setting screen is displayed in step S101, the cursor CR is placed initially in a predetermined one of the photo opportunity prioritized mode selection area Ar1, the standard mode selection area Ar2 and the image quality prioritized mode selection area Ar3. In accordance with one embodiment of the present invention, the cursor CR is placed in the standard mode selection area Ar2.

The imaging device 1 displaying the pixel count mode setting screen in step S101 performs determination steps in steps S102, S104, S106, S108 and S109. More specifically, the imaging device 1 waits on standby for a predetermined operation for selecting the standard mode (step S102), a predetermined operation for selecting the photo opportunity prioritized mode (step S104), an image quality prioritized mode (step S106), a decision operation (step S108) and a predetermined operation to shift to another menu (step S109).

If it is determined in step S102 that the operation for selecting the standard mode has been performed, processing proceeds to step S103. The imaging device 1 places the cursor CR in the standard mode selection area Ar2.

If it is determined in step S104 that the operation for selecting the photo opportunity prioritized mode has been performed, processing proceeds to step S105. The imaging device 1 places the cursor CR in the photo opportunity prioritized mode selection area Ar1.

If it is determined in step S106 that the operation for selecting the image quality prioritized mode has been performed, processing proceeds to step S107. The imaging device 1 places the cursor CR in the image quality prioritized mode selection area Ar3.

If it is determined in step S109 that the operation for shifting to another menu is performed, processing proceeds to step S114. The imaging device 1 quits displaying the pixel count mode setting screen and displays a menu screen specified in the operation performed in step S109.

If it is determined in step S108 that the decision operation has bee performed, processing proceeds to step S110.

The imaging device 1 determines in step S110 which mode, the standard mode, the photo opportunity prioritized mode or the image quality prioritized mode, has been selected currently (at the moment the decision operation has been performed). The cursor CR placed in the standard mode selection area Ar2 on the pixel count mode setting screen means that the standard mode has been selected. The cursor CR placed in the photo opportunity prioritized mode selection area Ar1 means that the photo opportunity prioritized mode has been selected. The cursor CR placed in the image quality prioritized mode selection area Ar3 means that the image quality prioritized mode has been selected.

If it is determined in step S110 that the standard mode has been selected, the imaging device 1 generates in step S111 the pixel count mode setting information indicating the standard mode and writes the pixel count mode setting information onto the flash memory 21.

If it is determined in step S110 that the photo opportunity prioritized mode has been selected, the imaging device 1 generates in step S112 the pixel count mode setting information indicating the photo opportunity prioritized mode and writes the pixel count mode setting information onto the flash memory 21.

If it is determined in step S110 that the image quality prioritized mode has been selected, the imaging device 1 generates in step S113 the pixel count mode setting information indicating the image quality prioritized mode and writes the pixel count mode setting information onto the flash memory 21.

Subsequent to one of steps S111, S112 and S113, the imaging device 1 proceeds to step S114. The imaging device 1 erases the pixel count mode setting screen and shifts to another process. For example, the imaging device 1 displays another menu screen or another monitor screen, or plays an image of a still image file stored on the recording medium 30.

Figure 8:
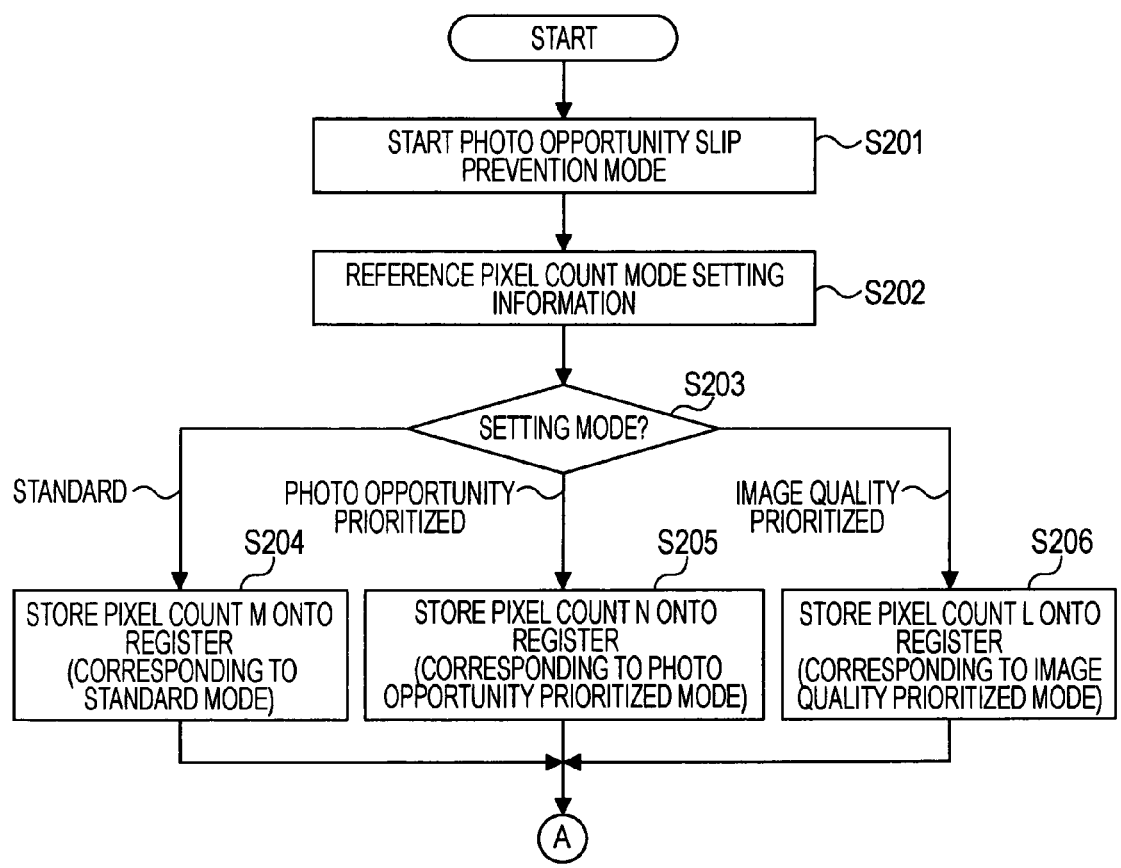
FIG. 8 is a flowchart illustrating the photographing and recording operation in the photo opportunity slip prevention function.
Figure 9:
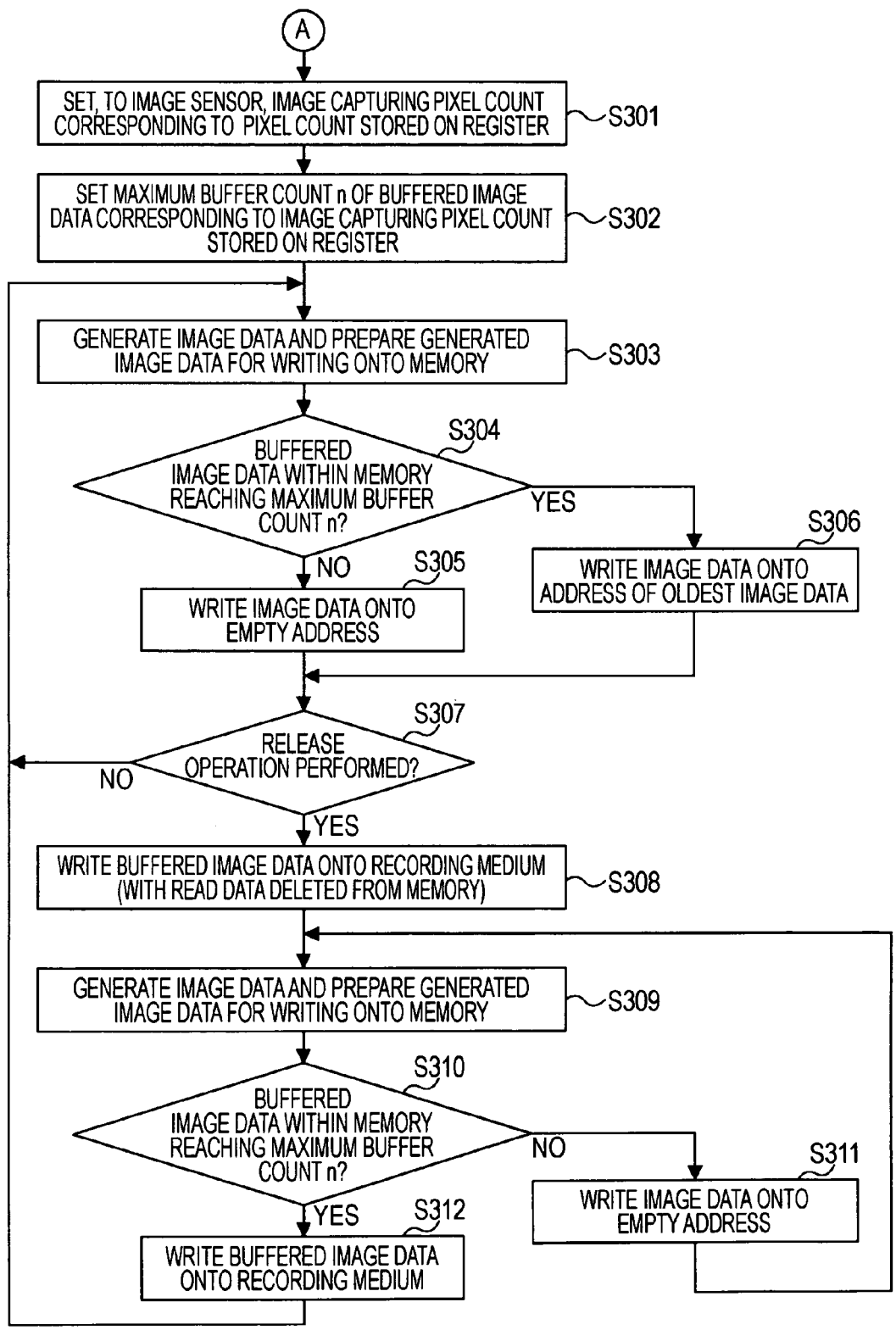
FIG. 9 is a continuation of the flowchart of FIG. 8.

With reference to FIGS. 8 and 9, the process of the imaging device 1 performing the photographing operation in the photo opportunity slip prevention function is described below.

The user instructs the imaging device 1 to start the photographing operation in the photo opportunity slip prevention function by performing a predetermined operation. In step S201 of FIG. 8, the imaging device 1 set the photo opportunity slip prevention function to start the photographing operation. With the photographing operation triggered, the imaging device 1 starts generating the image data in response to the image signal from the image sensor 12. In response to the shutter release operation, the imaging device 1 is ready to store the image data onto the recording medium 30.

The imaging device 1 references in step S202 the pixel count mode setting information stored on the flash memory 21 and determines in step S203 whether the pixel count mode setting information indicates the standard mode or the photo opportunity prioritized mode or the image quality prioritized mode.

If it is determined in step S203 that the pixel count mode setting information indicates the standard mode, processing proceeds to step S204. The imaging device 1 stores data indicating the pixel count M for the standard mode onto the register of the controller 18 (CPU).

If it is determined in step S203 that the pixel count mode setting information indicates the photo opportunity prioritized mode, processing proceeds to step S205. The imaging device 1 stores data indicating the pixel count N for the photo opportunity prioritized mode onto the register of the controller 18 (CPU).

If it is determined in step S203 that the pixel count mode setting information indicates the image quality prioritized mode, processing proceeds to step S206. The imaging device 1 stores data indicating the pixel count L for the image quality prioritized mode onto the register of the controller 18 (CPU).

Subsequent to one of steps S204, S205 and S206, processing proceeds to entry point A of a flowchart of FIG. 9.

In step S301 of FIG. 9, the signal processor 14 reads in step S301 the pixel count stored as a result of one of steps S204, S205 and S206 and determines the capturing-pixel count of the image sensor 12. Since the photographing operation is already activated in step S201 of FIG. 8, the image sensor 12 is also active. Subsequent to S301, the pixel count corresponding to one of the standard mode, the photo opportunity prioritized mode and the image quality prioritized mode has been set on the image sensor 12. The image sensor 12 outputs the image data obtained in accordance with the pixel count set in step S301. The signal processor 14 generates the image data having the pixel count (of one of M, N and L) corresponding to the capturing-pixel count.

In step S302, a maximum number n of buffers for the buffered image data having the pixel count (of one of M, N and L) stored on the register is set. More specifically, the number of units of buffered image data to be stored on a buffered image data area of the memory 15 assigned for the buffered image data is set. For example, the maximum number n may be determined by dividing the buffered image data area by the data size of the image data having the pixel count M.

As previously discussed, the maximum number n may be different depending on the pixel count mode (the standard mode, the photo opportunity prioritized mode and the image quality prioritized mode). The capacity of the buffered image data is determined based on the image-capturing periods T1 and T2 and the data size of the image data having the pixel count.

In step S303, the signal processor 14 performs a process of generating the image data by receiving the image signal of one still image and preparing the generated image data for storage onto the memory 15. In step S304, the signal processor 14 determines whether the image data (buffered image data) stored on the memory 15 reaches a maximum number n of buffers. If the answer to the determination in step S304 is non-affirmative, the memory 15 has still an empty area available for storage of the buffered image data. In step S305, the image data generated in step S303 is written onto an address specified in the empty area. The image data is thus written onto the empty area. Step S305 corresponds to the storage of image data D(1)-D(n) onto the memory 15 as shown in FIG. 3.

If the answer to the determination in step S304 is affirmative, no further image data can be written onto the memory 15. In step S306, the imaging device 1 writes the image data generated in step S303 on an address containing the oldest buffered image data stored on the memory 15. More specifically, the latest image data overwrites the oldest buffered image data stored on the memory 15. Step S306 corresponds to a write cycle starting with image data D(n+1) subsequent to a first write cycle of the image data of FIG. 3.

Subsequent to one of steps S305 and S306, the imaging device 1 determines in step S307 whether a shutter release operation has been performed. If it is determined in step S307 that a shutter release operation has not been performed, processing returns to step S303. More specifically, in steps S303-S307, the imaging device 1 waits on standby for a shutter release operation while buffering the buffered image data on the memory 15.

If it is determined in step S307 that a shutter release operation has been performed, processing proceeds to step S308.

In step S308, the imaging device 1 controls writing of the buffered image data stored on the memory 15 as a still image file onto the recording medium 30. In this way, the preceding images are multi-shot recorded. The buffered image data read from the memory 15 to be stored onto the recording medium 30 is deleted from the memory 15.

In step S309, the signal processor 14 in the imaging device 1 generates the image data based on the input image signal and prepares the generated image data for storage on the memory 15. The imaging device 1 then determines in step S310 whether the image data stored on the buffered image data area of the memory 15 has reached a maximum number n of buffers. Since the preceding image-capturing period T1 is approximately equal to the subsequent image-capturing period T2, the same maximum number n of buffers as in step S304 is used in step S310 as well. If the subsequent image-capturing period T2 different from the preceding image-capturing period T1 is to be set, a different number of buffers may be set and step S310 is then performed.

If the answer to the determination in step S310 is non-affirmative, the imaging device 1 writes the image data generated in step S309 onto an address empty in the buffered image data area.

When the buffered image data stored on the buffered image data area of the memory 15 reaches the maximum number n of buffers, processing proceeds from step S310 to step S312.

In step S312, the imaging device 1 writes the image data stored on the memory 15 onto the recording medium 30. In this way, the multi-shot recording of the subsequent images has been performed. Subsequent to step S312, processing returns to step S301.

The image data is recorded in the photo opportunity slip prevention function as discussed with reference to the flowcharts of FIG. 9 in conjunction with FIGS. 4 through 6. The image data as the preceding images stored on the memory 15 is recorded on the recording medium 30 with reference to the shutter release operation, and the image data storage area of the memory 15 is then emptied. New image data of a predetermined count of is successively stored onto the memory 15 and then recorded as the preceding images. More specifically, a cycle of the reading of the image data from the memory 15 and then the recording of the read image data onto the recording medium 30 is performed respectively twice, one for the preceding image group and one for the subsequent image group.

In such a procedure, the memory 15 having a small memory capacity works because the image data storage area of the memory 15 stores either the preceding images or the subsequent images.

The cycle of the reading of the image data from the memory 15 and the recording of the read image data onto the recording medium 30 is performed at timings different from the preceding images to the subsequent images. In such a case, the timing of starting generation and storage of the image data as the subsequent images onto the memory 15 can be delayed depending on characteristics of the memory 15 and a control algorithm to the recording medium 30.

Such an inconvenience can be overcome as described below.

An area for the preceding images and an area for the subsequent images are set up as the image data storage area in the memory 15. The preceding images and the image data thereof, present at the shutter release operation, remain stored on the image data storage area for the preceding images. The successive generation of the image data of the subsequent images is immediately started and then stored onto the image data storage area for the subsequent images. At the moment the required number of units of subsequent images is stored, the image data of the preceding images and the image data of the subsequent images, stored on the memory 15, are written onto the recording medium 30. Such a process may be performed by eliminating step S308 and writing, as the buffered image data, the image data of the preceding images and the subsequent images onto the recording medium 30 at a time in step S312 in the flowchart of FIG. 8. Also, such a process may be performed by eliminating step S408 and writing, as the buffered image data, the image data of the preceding images and the subsequent images onto the recording medium 30 at a time in step S413 in the flowchart of FIG. 9.

The present invention is not limited to the recording timings of the preceding images and the subsequent images described above. The present invention is not limited to the above-described embodiments.

The time lengths of the image-capturing periods T1 and T2 are approximately equal to the counterparts among the pixel count modes in the above discussion. This assumption is for convenience of explanation only. Given approximately the same image-capturing periods, the number of units of image data acquired within the period change depending on the pixel count (process time).

In accordance with one embodiment of the present invention, the image-capturing periods T1 and T2 may be appropriately set. For example, at least one of the image-capturing period T1 and T2 in the photo opportunity prioritized mode may be set to be shorter than the counterpart in the standard mode. With this setting, the overall data size of the image data (still image file) multi-shot recorded on the storage medium 30 in the photo opportunity prioritized mode becomes smaller than in the standard mode. The memory capacity of the storage medium 30 is conserved and effectively used.

In accordance with one embodiment of the present invention, the preceding image-capturing period T1 is set to be approximately equal to the subsequent image-capturing period T2 in the photographing and recording operation in one of the pixel count modes. Alternatively, the preceding image-capturing period T1 may be different from the subsequent image-capturing period T2.

In accordance with one embodiment of the present invention, the photo opportunity prioritized mode and the image quality prioritized mode are arranged in addition to the standard mode. One of the photo opportunity prioritized mode and the image quality prioritized mode may be further divided into sub modes having different pixel counts from that of the standard mode.

The user interface for setting the multi-shot interval in the photo opportunity slip prevention function is not limited to the user interface discussed with reference to FIG. 2.

For example, the name of each mode is shown in each selection area for each multi-shot interval (namely, pixel count) to be set as shown in FIG. 2. Alternatively, the user interface may be set up so that a pixel count to be set is displayed for selection by the user.

In the photo opportunity slip prevention function, the photographing and recording operation may be unperformed during the subsequent image-capturing period T2 or the preceding image-capturing period T1 on condition that the image data generated at the same timing in an ordinary photographing mode responsive to the shutter release operation is recorded. In any case, the photo opportunity slip prevention effect is still provided in comparison with the case in which only a single image at the shutter release operation is recorded in the ordinary photographing mode. The embodiments of the present invention are applied in this case without any problem.

The imaging device 1 is a digital still camera recording a captured image as a still image. A video recorder having a still image recording function identical to that of the digital still camera is known. Such a video recorder records a captured moving image as a digital signal. The present invention is also applicable to the still image recording function for such a video recorder. The present invention is also applicable to a wide range of electronic devices having an imaging function including a mobile phone and other terminals.

Modifications and changes may be incorporated in the multi-shot interval setting process in the photo opportunity slip prevention function and the photographing and recording operation, discussed with reference to the flowcharts of FIGS. 7-9.

With reference to FIGS. 8 and 9, the maximum number of buffers for the buffered image data is determined and whether to store the buffered image data onto the memory 15 is determined based on the determination as to whether the maximum number of buffers has been reached. Alternatively, an available memory capacity for the buffered image data may be compared with the data size of the image data to be written.

With reference to FIGS. 8 and 9, the image data B(1)-B(n) generated subsequent to time point t1 is stored on the memory 15 in the subsequent image-capturing period T2 and then recorded onto the recording medium 30. Alternatively, without storing the image data B(1)-B(n) on the memory 15, the image data B(1)-B(n) is successively transferred to the encoder/decoder 16 and then recorded on the recording medium 30.

The method steps described in FIGS. 7-9 may be carried out when the controller 18 as the CPU performs the computer program thereof. Such a computer program may be pre-stored on one of the ROM 19 and the flash memory 21 in the configuration shown in FIG. 1 in a manufacturing phase of the imaging device 1. For example, the computer program may be stored in a package medium, an external storage device, or a sever on a network, and then installed onto and updated on the imaging device 1 from such a recording medium or a device.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:

image signal acquisition means for acquiring an image signal in an electrical form by converting input image-bearing light into the image signal;

data generation means for generating successively image data containing a still image by inputting successively the image signal corresponding to one still image unit;

record control means for recording, on a recording medium, the image data of a predetermined number of units successively acquired during a first image capturing period prior to a timing of a shutter release operation and the image data of a predetermined number of units successively acquired during a second image capturing period subsequent to the timing of the shutter release operation;

operation means for enabling a user to perform an operation to select a desired pixel count of pixels of the image data from among three different pixel counts, the image data containing a two-dimensional set of pixels, wherein an interval of successive imaging is changed based on the selected pixel count;

pixel count setting control means for controlling setting of the pixel count so that the pixel count of the image data to be recorded by the record control means reaches the selected pixel count;

capturing period control means for controlling, for a pixel count mode corresponding to the selected pixel count, setting of a length of the first image capturing period to be different than a length of the second image capturing period;

data storage control means for storing, on a predetermined memory thereof, the image data of the predetermined number of units successively acquired during the first image capturing period prior to the timing of the shutter release operation at a first time and the image data of the predetermined number of units successively acquired during the second image capturing period subsequent to the timing of the shutter release operation at a second time different from the first time, wherein the data storage control means is for emptying the predetermined memory before the image data of the predetermined number of units successively acquired during the second image capturing period subsequent to the timing of the shutter release operation is stored on the predetermined memory at the second time, such that at the second time the image data of the predetermined number of units successively acquired during the first image capturing period prior to the timing of the shutter release operation is not on the predetermined memory, wherein the record control means (i) records onto the recording medium at a first recording timing the image data of the predetermined number of units successively acquired during the first image capturing period prior to the timing of the shutter release operation stored on the predetermined memory and (ii) records onto the recording medium at a second recording timing which is different from the first recording timing the image data of the predetermined number of units successively acquired during the second image capturing period subsequent to the timing of the shutter release operation stored on the predetermined memory.

2. An image signal processing method, comprising steps of:
acquiring an image signal in an electrical form by converting input image-bearing light into the image signal;
generating successively image data containing a still image by inputting successively the image signal corresponding to one still image unit;
recording, on a recording medium, the image data of a predetermined number of units successively acquired during a first image capturing period prior to a timing of a shutter release operation and the image data of a predetermined number of units successively acquired during a second image capturing period subsequent to the timing of the shutter release operation;
enabling a user to select a desired pixel count of pixels of the image data from among three different pixel counts and storing information relating thereto, the image data containing a two-dimensional set of pixels;
changing an interval of successive imaging based on the selected pixel count;
controlling setting of the pixel count so that the pixel count of the image data to be recorded reaches the selected pixel count;
controlling, for a pixel count mode corresponding to the selected pixel count, setting of a length of the first image capturing period to be different than a length of the second image capturing period;
storing, on a predetermined memory thereof, the image data of the predetermined number of units successively acquired during the first image capturing period prior to the timing of the shutter release operation at a first time and the image data of the predetermined number of units successively acquired during the second image capturing period subsequent to the timing of the shutter release operation at a second time different from the first time, and emptying the predetermined memory before the storing of the image data of the predetermined number of units successively acquired during the second image capturing period subsequent to the timing of the shutter release operation on the predetermined memory at the second time, such that at the second time the image data of the predetermined number of units successively acquired during the first image capturing period prior to the timing of the shutter release operation is not on the predetermined memory,
wherein the recording step (i) records onto the recording medium at a first recording timing the image data of the predetermined number of units successively acquired during the first image capturing period prior to the timing of the shutter release operation stored on the predetermined memory and (ii) records onto the recording medium at a second recording timing which is different from the first recording timing the image data of the predetermined number of units successively acquired during the second image capturing period subsequent to the timing of the shutter release operation stored on the predetermined memory.

3. A non-transitory computer readable medium having stored thereon a program for use with an imaging device, said program comprising steps of:

generating successively image data containing a still image by inputting successively an image signal in an electrical form corresponding to one still image unit, the image signal acquired from input image-bearing light;
recording, on a recording medium, the image data of a predetermined number of units successively acquired during a first image capturing period prior to a timing of a shutter release operation and the image data of a predetermined number of units successively acquired during a second image capturing period subsequent to the timing of the shutter release operation;
enabling a user to select a desired pixel count of pixels of the image data from among three different pixel counts and storing information relating thereto, the image data containing a two-dimensional set of pixels;
changing an interval of successive imaging based on the selected pixel count;
controlling setting of the pixel count so that the pixel count of the image data to be recorded reaches the selected pixel count;
controlling, for a pixel count mode corresponding to the selected pixel count, setting of a length of the first image capturing period to be different than a length of the second image capturing period;
storing, on a predetermined memory thereof, the image data of the predetermined number of units successively acquired during the first image capturing period prior to the timing of the shutter release operation at a first time and the image data of the predetermined number of units successively acquired during the second image capturing period subsequent to the timing of the shutter release operation at a second time different from the first time, and emptying the predetermined memory before the storing of the image data of the predetermined number of units successively acquired during the second image capturing period subsequent to the timing of the shutter release operation on the predetermined memory at the second time, such that at the second time the image data of the predetermined number of units successively acquired during the first image capturing period prior to the timing of the shutter release operation not on the predetermined memory,
wherein the recording step (i) records onto the recording medium at a first recording timing the image data of the predetermined number of units successively acquired during the first image capturing period prior to the timing of the shutter release operation stored on the predetermined memory and (ii) records onto the recording medium at a second recording timing which is different from the first recording timing the image data of the predetermined number of units successively acquired during the second image capturing period subsequent to the timing of the shutter release operation stored on the predetermined memory.

4. An imaging device, comprising:
an image signal acquisition unit acquiring an image signal in an electrical form by converting input image-bearing light into the image signal;
a data generation unit generating successively image data containing a still image by inputting successively the image signal corresponding to one still image unit;
a record control unit recording, on a recording medium, the image data of a predetermined number of units successively acquired during a first image capturing period prior to a timing of a shutter release operation and the image data of a predetermined number of units successively acquired during a second image capturing period subsequent to the timing of the shutter release operation;

an operation unit enabling a user to perform an operation to select a desired pixel count of pixels of the image data from among three different pixel counts, the image data containing a two-dimensional set of pixels, wherein an interval of successive imaging is changed based on the selected pixel count;

a pixel count setting control unit controlling setting of the pixel count so that the pixel count of the image data to be recorded by the record control unit reaches the selected pixel count;

a capturing period control unit controlling, for a pixel count mode corresponding to the selected pixel count, setting of a length of the first image capturing period to be different than a length of the second image capturing period;

a data storage control unit storing, on a predetermined memory thereof, the image data of the predetermined number of units successively acquired during the first image capturing period prior to the timing of the shutter release operation at a first time and the image data of the predetermined number of units successively acquired during the second image capturing period subsequent to the timing of the shutter release operation at a second time different from the first time, the data storage control unit emptying the predetermined memory before the image data of the predetermined number of units successively acquired during the second image capturing period subsequent to the timing of the shutter release operation is stored on the predetermined memory at the second time, such that at the second time the image data of the predetermined number of units successively acquired during the first image capturing period prior to the timing of the shutter release operation is not on the predetermined memory, wherein the record control unit (i) records onto the recording medium at a first recording timing the image data of the predetermined number of units successively acquired during the first image capturing period prior to the timing of the shutter release operation stored on the predetermined memory and (ii) records onto the recording medium at a second recording timing which is different from the first recording timing the image data of the predetermined number of units successively acquired during the second image capturing period subsequent to the timing of the shutter release operation stored on the predetermined memory.

* * * * *